US 12,184,552 B2

(12) United States Patent
Kadam et al.

(10) Patent No.: US 12,184,552 B2
(45) Date of Patent: Dec. 31, 2024

(54) FIREWALL LOAD BALANCING WITH TUNNEL SWITCHING PROTOCOLS

(71) Applicant: Palo Alto Networks, Inc., Santa Clara, CA (US)

(72) Inventors: Avaneesh Anandrao Kadam, Sunnyvale, CA (US); Bhaskar Bhupalam, Fremont, CA (US); Ketan Gunawant Kulkarni, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 213 days.

(21) Appl. No.: 17/660,128

(22) Filed: Apr. 21, 2022

(65) Prior Publication Data
US 2023/0344770 A1 Oct. 26, 2023

(51) Int. Cl.
*H04L 47/125* (2022.01)
*H04L 9/40* (2022.01)
*H04L 12/46* (2006.01)

(52) U.S. Cl.
CPC ........ *H04L 47/125* (2013.01); *H04L 12/4633* (2013.01); *H04L 63/0218* (2013.01); *H04L 63/029* (2013.01)

(58) Field of Classification Search
None
See application file for complete search history.

(56) References Cited

U.S. PATENT DOCUMENTS

| 11,855,896 B1* | 12/2023 | Cheung | .................. H04L 12/66 |
| 2011/0252127 A1* | 10/2011 | Iyengar | ............... H04L 67/1008 709/227 |
| 2016/0373407 A1* | 12/2016 | Floyd, III | ............... H04L 63/20 |
| 2021/0067468 A1* | 3/2021 | Cidon | ................... H04L 49/354 |

(Continued)

FOREIGN PATENT DOCUMENTS

CN 112422446 A * 2/2021 ........... H04L 47/125

OTHER PUBLICATIONS

M. Hossain, How Service Function Chaining and Network Slicing complement each other in 5G network?, pp. 1-14 (Year: 2021).*

(Continued)

*Primary Examiner* — Christopher M Crutchfield
(74) *Attorney, Agent, or Firm* — Gilliam IP PLLC

(57) ABSTRACT

An auto scale monitoring service performs load balancing on a cloud firewall with minimized traffic disruption using eager and lazy load balancing protocols. The auto scale monitoring service operates through an orchestrator that initializes a new firewall and sends forwarding instructions to the new firewall for rerouting excess traffic. The auto scale monitoring service additionally operates through a software-defined wide area network controller that sends routing instructions to a local branch of network devices to reroute to the new firewall from an overloaded current firewall. The eager protocol immediately tears down a tunneling session from the local branch to the current firewall and the lazy protocols gradually tears down this tunneling session. Both protocols properly inform firewalls how to forward ongoing traffic in each case and establish updated traffic flow through a tunneling session from the local branch to the new firewall.

20 Claims, 5 Drawing Sheets

(56) References Cited

U.S. PATENT DOCUMENTS

2022/0006748 A1* 1/2022 Pallagatti Kotrabasappa .............. G06N 20/00

OTHER PUBLICATIONS

C. Quispe, C. Santivanez, Cost-effective N:1 Firewall Array via subnet-level load balancing by SDN/OpenFlow switches, pp. 1-6 (Year: 2018).*
W. Silva, D. Sadok, Control Inbound Traffic: Evolving the Control Plane Routing System with Software Defined Networking, pp. 1-6 (Year: 2017).*

* cited by examiner

FIREWALL LOAD BALANCING WITH TUNNEL SWITCHING PROTOCOLS

BACKGROUND

The disclosure generally relates to transmission of digital information (e.g., CPC section H04L) and to network architectures or network communication protocols for network security (e.g., CPC section H04L 63/00).

Wide area networks (WANs) manage nodes connected to the Internet across geographical regions. Devices connected to WANs can be managed by private localized networks (e.g., local area networks (LANs)) and the WANs can manage traffic between private networks, firewalls, and the Internet using virtual private networks (VPNs). VPNs use tunneling protocols to encrypt and mask sources/destinations of private network traffic. Software-defined wide area networks (SD-WANs) centralize the routing process (i.e., the control plane) for the WAN, allowing for granular rerouting of traffic to and from each private network.

BRIEF DESCRIPTION OF THE DRAWINGS

Aspects of the disclosure may be better understood by referencing the accompanying drawings.

DESCRIPTION

Figure 1:
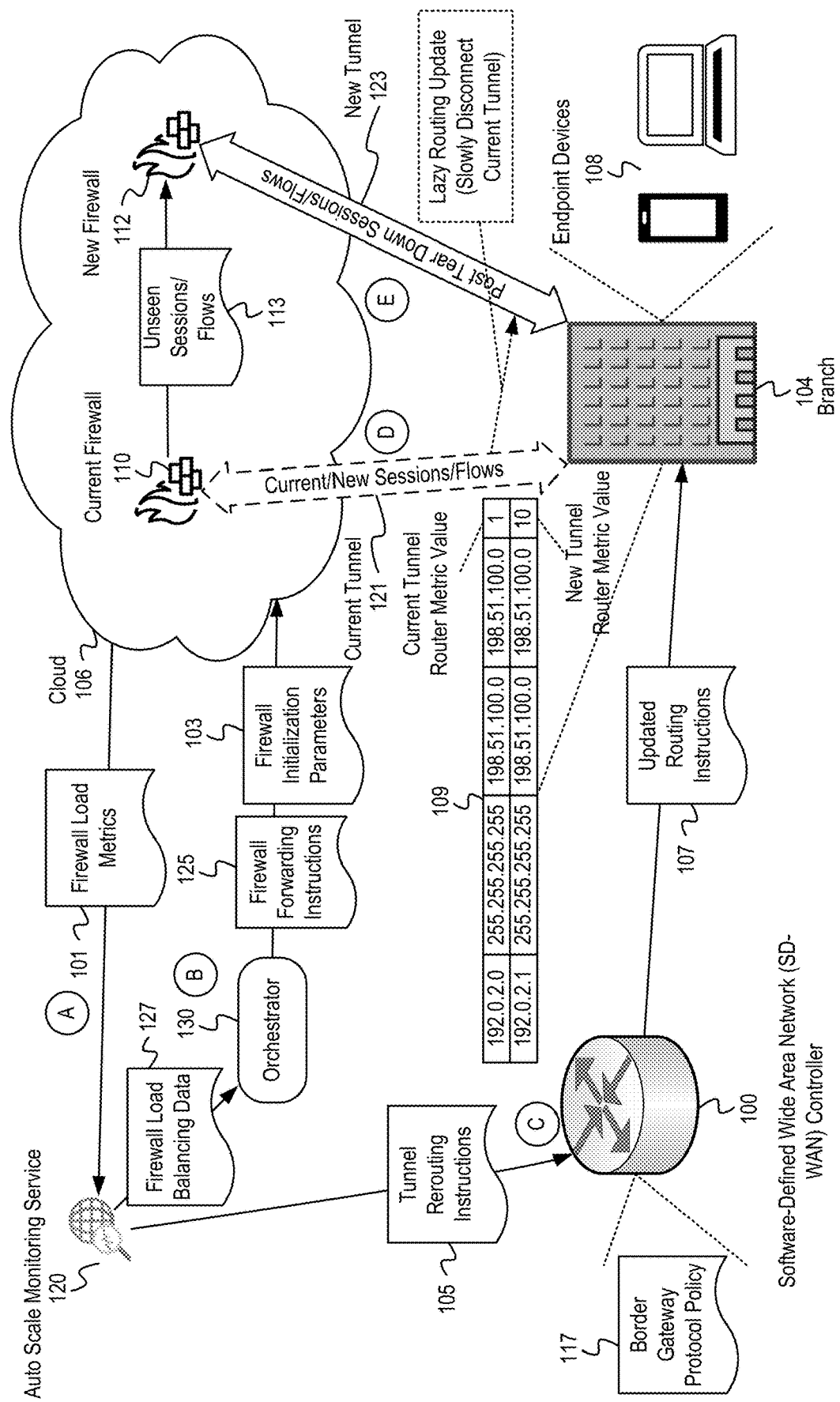
FIG. 1 depicts a schematic diagram of an example system for load balancing firewall VPN traffic using a lazy switching protocol.

The description that follows includes example systems, methods, techniques, and program flows that embody aspects of the disclosure. However, it is understood that this disclosure may be practiced without these specific details. For instance, this disclosure refers to load balancing firewall traffic in a cloud using switching protocols in illustrative examples. Aspects of this disclosure can be also applied to load balancing traffic to other types of virtual machines in a cloud using switching protocols. In other instances, well-known instruction instances, protocols, structures and techniques have not been shown in detail in order not to obfuscate the description.

Overview

Load balancing firewalls deployed as VMs in a cloud can result in temporary traffic disruption due to changeover of tunnel VPN connections from current to new firewalls initialized to handle additional load. To prevent traffic disruption, presently disclosed are "lazy" and "eager" switching protocols from the current to the new firewall that appropriately handle existing sessions/flows of network traffic along a current VPN tunnel to the current firewall and eventually redirect all new sessions/flows to a new VPN tunnel for the new firewall. Once an auto scale monitoring service managing firewalls in the cloud detects that the load at a firewall crosses a threshold, the auto scale monitoring service identifies a branch office ("branch") for traffic rerouting from the overloaded firewall and prompts an orchestrator to initialize a new firewall in the cloud that is configured to handle the redirected traffic. The orchestrator instructs the current and new firewalls on how to handle existing and new sessions/flows until the current tunnel is deactivated. The auto scale monitoring service additionally communicates routing data to a SD-WAN controller that directs network traffic at the branch being redirected. According to an internal border gateway protocol policy, the SD-WAN controller sends instructions to update routing tables to a local router at the branch that reroutes traffic from the overloaded firewall.

In the lazy switching protocol, the current firewall is instructed by the orchestrator to forward any incoming traffic not associated with existing sessions/flows. The SD-WAN controller instructs the branch to establish a new VPN tunnel to the new firewall, to update the branch routing tables to add an additional, less favorable route along the new VPN tunnel, and to advertise the current VPN tunnel. Once existing sessions have terminated across the current tunnel and/or a timeout occurs, a local router(s) managing network devices of the branch tears down the current tunnel and future traffic is directed through the new tunnel according to the updated routing table. In the eager switching protocol, the orchestrator instructs the current firewall to forward all existing sessions/flows to the new firewall and additionally instructs the current firewall to communicate a list of tuples specifying metadata for current sessions/flows to the new firewall. The SD-WAN controller instructs the router(s) at the branch to establish a new VPN tunnel to the new firewall, to update the branch routing tables with the route to the new firewall, and to advertise the new VPN tunnel. The current tunnel is subsequently torn down. All new and current sessions/flows proceed to the new firewall via the new tunnel, and traffic detected as corresponding to current sessions/flows gets forwarded by the current firewall to the new firewall according to the orchestrator's instructions. These lazy and eager switching protocols allow for seamless load balancing across cloud firewalls with limited traffic disruption.

Terminology

This description uses shorthand terms related to cloud technology for efficiency and ease of explanation. When referring to "a cloud," this description is referring to the resources of a cloud service provider. For instance, a cloud can encompass the servers, virtual machines (VMs), and storage devices of a cloud service provider (CSP). A CSP resource accessible to customers is a resource owned/managed by a CSP entity that is accessible via network connections. Often, the access is in accordance with an application programming interface (API) or software development kit provided by the CSP.

The term "traffic" is synonymous with network traffic and refers to a collection of protocol data units (e.g., packets, datagrams, frames) moving across a route in a network. Transmission rate of traffic can be measured, for instance, in megabits per second (Mbps).

The term "session" refers to an established communication exchange between two or more nodes in a network. Sessions can occur according to network protocols corresponding to the application, session, or transport layers (e.g., Hypertext Transfer Protocol session, Transmission Control Protocol sessions, Layer 2 Tunneling Protocol sessions, etc.). Sessions can implement asymmetric routing wherein the route from source to destination is distinct from destination to source.

The term "network traffic flow" (often truncated to "traffic flow" or "flow") refers to a sequence of protocol data units (PDUs), usually packets, carrying information between hosts/nodes. The PDUs of a flow will have common properties. Further refinement of the meaning of network traffic flow with respect to the common properties of the sequence of PDUs will vary depending on hardware observing the flow, network protocols being used, etc.

The terms "router" and "routing device" are used interchangeably to refer to any network device configured to manage flow of traffic over a network. For instance, a router/routing device can be a network device managing network traffic for a local area network (LAN), a network device managing traffic for a mesh network, a network device managing traffic for an Internet gateway of a CSP, etc.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Illustrations

Figure 2:
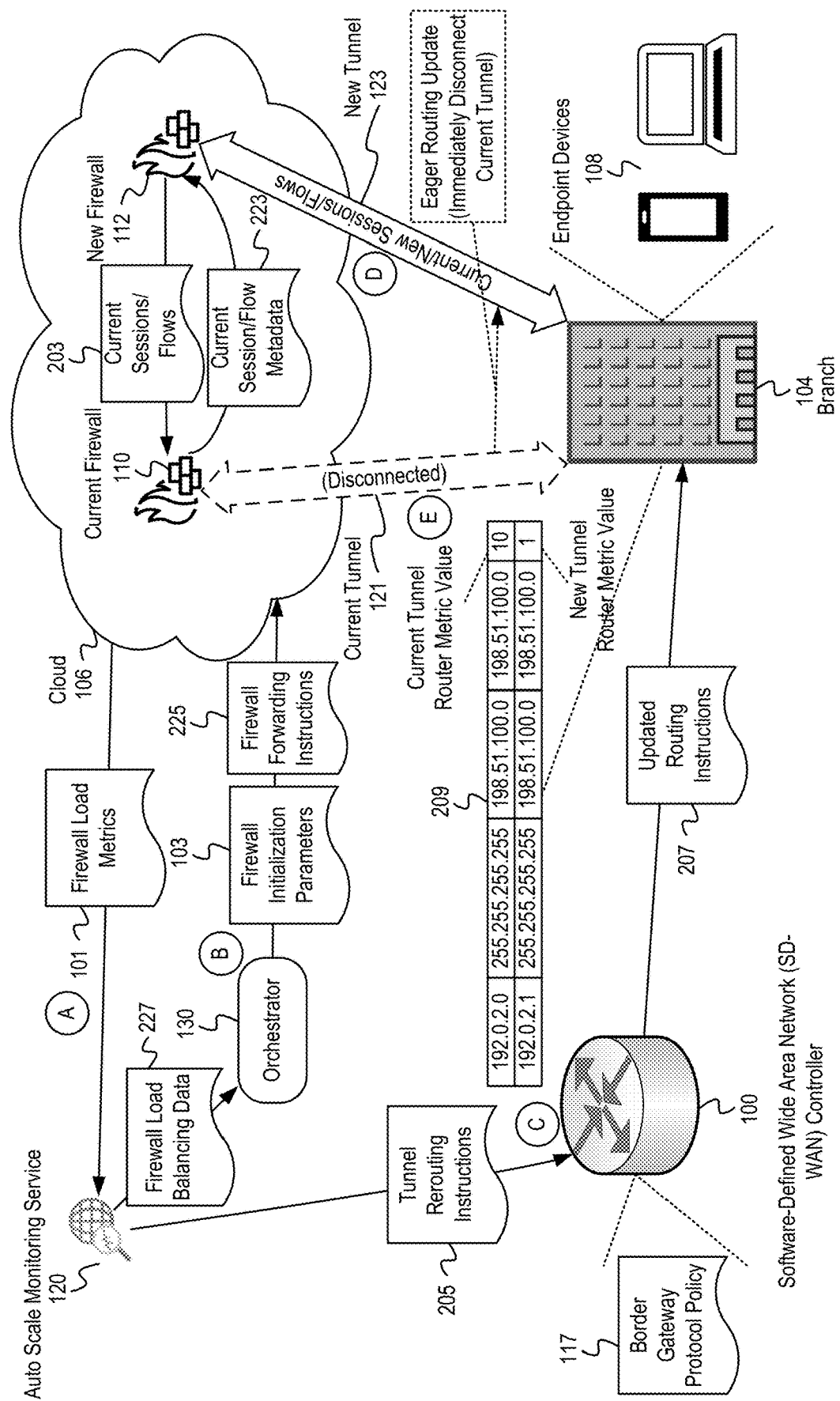
FIG. 2 depicts a schematic diagram of an example system for load balancing firewall VPN traffic using an eager switching protocol.

FIGS. 1 and 2 are schematic diagrams illustrating different tunnel switching protocols for load balancing across firewalls. FIGS. 1 and 2 are annotated with a series of letters A-E. These letters represent stages of operations. Although these stages are ordered for this example, the stages illustrate one example to aid in understanding this disclosure and should not be used to limit the claims. Subject matter falling within the scope of the claims can vary with respect to the order and some of the operations. While branch refers to a branch office, the term is also used in this description to refer to the one or more network devices (e.g., routers) of a branch office for reading efficiency.

FIG. 1 depicts a schematic diagram of an example system for load balancing firewall VPN traffic using a lazy switching protocol. An auto scale monitoring service 120 manages load balancing for firewalls running on a cloud 106. Load balancing occurs both vertically (i.e., adding load to an existing firewall instance(s) in the cloud by redirecting sessions/flows to the firewall instance(s)) and horizontally (i.e., adding firewall instances to increase overall system capacity across the cloud). The auto scale monitoring service 120 manages firewall instances on the cloud 106 via an orchestrator 130 and manages routing at local branches such as branch 104 via a SD-WAN controller 100. The auto scale monitoring service 120 performs a lazy switching protocol to update VPN tunnels in response to performance and/or load balancing issues on a firewall instance(s) in the cloud 106. This protocol is referred to as "lazy" because it allows sessions/flows to resolve in a current tunnel prior to advertising routing towards a new tunnel.

At stage A, the auto scale monitoring service 120 receives firewall load metrics 101 from the cloud 106. The firewall load metrics 101 comprise metrics indicating load for firewall VMs running in the cloud 106 such as, e.g., average load over last hour, day, week, maximum load, etc. The firewall load metrics 101 can further comprise metrics tracking fidelity of firewall operations such as packet loss, receiving/forwarding errors, route not found errors, etc. While examples refer to metrics relating to load to address performance and/or load balancing issues, embodiments can redirect tunnels using any of the presently disclosed methods to replace a faulty firewall VM. These metrics can be communicated to the auto scale monitoring service 120 according to a schedule or based on queries to a service or repository (e.g., a data lake) hosted in the cloud 106. The auto scale monitoring service 120 can query the cloud 106 for metrics using an API for a CSP providing the cloud 106. The auto scale monitoring service 120 can determine whether any of the firewall load metrics 101 exceed thresholds that trigger a load balancing event. The thresholds can depend on a type of metric, a type of virtual firewall, a maximum load of a virtual firewall, etc.

When the auto scale monitoring service 120 identifies a virtual machine running a firewall in the cloud 106 (depicted as a current firewall 110 in FIG. 1) that requires traffic rerouting for load balancing or other issues, the auto scale monitoring service 120 generates firewall load balancing data 127 and tunnel rerouting instructions 105 that it communicates to the orchestrator 130 and the SD-WAN controller 100, respectively. The firewall load balancing data 127 comprises configuration data for generating a new firewall 112 that can adequately balance traffic load from the current firewall 110. For instance, this configuration data can specify a required minimum load, protocol types for message transmission, a type of firewall equivalent to the current firewall 110, any initialization parameters for the new firewall 112, etc. The firewall load balancing data 127 can further include which type of switching protocol to implement (lazy or eager) or, in other embodiments, the orchestrator 130 can make this determination.

The tunnel rerouting instructions 105 comprise routing data for the new firewall 112 such as a destination (elastic) IP address, tunneling protocols, etc., indications of a lazy switching protocol, and indications of the branch 104 identified for traffic rerouting. The auto scale monitoring service 120 can identify the branch 104 based on the amount of traffic occurring between the branch 104 and the current firewall 110. For instance, if the threshold load at the current firewall 110 is 100 megabits per second (Mbps), the current firewall 110 has a current load of 150 Mbps, and the branch 104 sends at least 60 Mbps of traffic to the current firewall, then the auto scale monitoring service 120 can identify the branch 104 for traffic rerouting to reduce the load on the current firewall 110 below 90 Mbps. Identification of the branch 104 can comprise more sophisticated analysis that, for example, analyzes load variation across a time interval and customer characteristics. For instance, the analysis can involve tracking load at the current firewall 110 across time of day and selecting a branch that generates more traffic at times of day when the current firewall 110 experiences high load.

At stage B, the orchestrator 130 receives the firewall load balancing data 127 and generates firewall forwarding instructions 125 and firewall initialization parameters 103 which it communicates to the cloud 106. The orchestrator 130 can communicate with the cloud 106 using an API for a corresponding CSP that describes commands for firewall VM initialization and packet handling by each firewall VM. Alternatively, the orchestrator 130 can natively host the current firewall 110 and the new firewall 112 in the cloud 106 without the need to access an API for the cloud 106. The firewall initialization parameters 103 initialize a firewall with a type and configuration according to that determined by the auto scale monitoring service 120 for adequate load balancing. The firewall forwarding instructions 125 instruct the current firewall 110 to forward packets not associated with existing sessions or flows to the new firewall 112. The cloud 106 initializes the new firewall 112 and configures the current firewall 110 to forward unseen sessions/flows 113 to the new firewall 112 as designated by API commands in the firewall forwarding instructions 125 and the firewall initialization parameters 103. Stage B can occur prior to routing table updates because the current firewall 110 will typically only see flows/sessions designated for the current firewall 110 and not the new firewall 112.

At stage C, the SD-WAN controller 100 receives the tunnel rerouting instructions 105 which it uses to generate updated routing instructions 107. The SD-WAN controller 100 maintains a border gateway protocol (BGP) policy 117 that it uses to manage communications outside of the wide area network that it controls. The internal policies of the BGP policy 117 are agnostic to interactions of the SD-WAN controller 100 with other autonomous systems (e.g., an autonomous system running on the cloud 106 that manages routing for the current firewall 110 and the new firewall 112). The updated routing instructions 107 instruct the branch 104 to establish the new tunnel 123, update its routing tables to include a route for the new tunnel 123 having a lower router metric value than the current tunnel 121 and advertise the current tunnel 121 over the new tunnel 123 so new and existing sessions/flows are discouraged from routing to the new firewall 112.

An example updated routing table 109 is the following:

| Destination | Subnet Mask | Gateway | Interface | Router metric |
|---|---|---|---|---|
| 192.0.2.0 | 255.255.255.255 | 198.51.100.0 | 198.51.100.0 | 1 |
| 192.0.2.1 | 255.255.255.255 | 198.51.100.0 | 198.51.100.0 | 10 |

In this example, the first row corresponds to destination (i.e., next hop) of the current firewall 110 at IP address 192.0.2.0 and the second row corresponds to destination of the new firewall 112 at IP address 192.0.2.1. Each destination corresponds to a single subnet with the corresponding IP address due to the subnet mask 255.255.255.255. In both rows, the gateway and interface are equivalent—198.51.100.0. In the depicted example this corresponds to the IP address of a local branch router operating at the branch 104, wherein the branch 104 comprises endpoint devices 108 connected across a LAN or other type of localized network such as mobile devices, remote user devices, devices connected to local area office networks, etc. In instances where communications with the cloud 106 and the branch 104 require more than one hop, the gateway and interface fields can be distinct. The router metric value (e.g., a tunnel preference value or route preference value) for the first row (the current firewall 110) is 1 whereas the router metric value for the second row (corresponding to the new firewall 112) is 10, so forwarding tables derived from the updated routing tables 107 will favor the current firewall 110.

At stage D, a local branch router at the branch 104 establishes the new tunnel 123 to the new firewall 112 and updates its routing and/or forwarding tables according to the updated routing tables 107. The current tunnel 121 and new tunnel 123 can be established and deactivated according to any data-link layer or network layer tunneling protocol. Traffic for current sessions/flows as well as new sessions/flows occurring at stage D will continue to be received by the current firewall 110. Any new flows/sessions received by the current firewall 110 will be detected as not corresponding to a current flow/session and will be forwarded to the new firewall 112 by the current firewall 110. One of the new firewall 112 and current firewall 110 can be instructed to not send reply packets for the unseen sessions/flows 113 back to the branch 104 to avoid routing loops and sorcerer's apprentice syndrome-type bugs.

At stage E, after one or more tear down criteria are satisfied, the branch 104 deactivates the current tunnel 121 and removes any connections from its routing table. Post tear down sessions/flows now proceed through the new tunnel 123. The tear down criteria can depend on termination of sessions and flows known to the current firewall 110 and/or timeout(s) based on these sessions and flows. The tear down criteria are described in greater detail with reference to FIG. 3.

FIG. 2 depicts a schematic diagram of an example system for load balancing firewall VPN traffic using an eager switching protocol. Many components in FIG. 2 have the same labels as components in FIG. 1 to illustrate the capability of the same system to execute both eager and lazy switching protocols for load balancing. In other embodiments, deployments can vary across eager and lazy switching protocols. For instance, the firewall initialization parameters 103 for the new firewall 112, the choice of the branch 104 for traffic rerouting, etc. can vary with respect to protocol choice. Stage A occurs similarly to FIG. 1, wherein the auto scale monitoring service 120 identifies the current firewall 110 for load balancing based on metrics indicated in the firewall load metrics 101.

At stage B, the auto scale monitoring service 120 communicates firewall load balancing data 227 to the orchestrator 130. The firewall load balancing data 227 includes forwarding instructions specific to the eager switching protocol as well as initialization parameters for the new firewall 112. The orchestrator 130 generates firewall instantiation parameters 103 and firewall forwarding instructions 225 which it communicates to a CSP running the cloud 106 using a CSP API. The cloud 106 initializes the new firewall 112 and directs the current firewall 110 to communicate current session/flow metadata 223 to the new firewall 112 according to the firewall forwarding instructions 225. The current session/flow metadata 223 comprises identifying information for sessions/flows established along the current tunnel such as source and destination IP addresses, protocol identifiers, session identifiers, session state, etc.

At stage C, the auto scale monitoring service 120 communicates tunnel rerouting instructions 205 to the SD-WAN controller 100. The tunnel rerouting instructions 205 comprise destination route data for the new tunnel 123, indications of the eager switching protocol, and indications of the branch 104. The SD-WAN controller 100 generates updated routing instructions 207 according to the BGP policy 117 and the eager switching protocol. Instructions relating to the eager switching protocol cause router(s) managing a local area network at the branch 104 to establish the new tunnel 123, add the new tunnel 123 to the routing table with a lower router metric value than the current tunnel 121 and advertise the new tunnel 123 over the current tunnel 121. An example updated routing table 209 is the following:

| Destination | Subnet Mask | Gateway | Interface | Router metric |
|---|---|---|---|---|
| 192.0.2.0 | 255.255.255.255 | 198.51.100.0 | 198.51.100.0 | 10 |
| 192.0.2.1 | 255.255.255.255 | 198.51.100.0 | 198.51.100.0 | 1 |

This table is equivalent to the example updated routing table 109 for the lazy switching protocol except that the first row corresponding to the current tunnel 121 has router metric value 10 and the second row corresponding to the new tunnel 123 has router metric value 1. This means that forwarding tables generated from the example updated routing table 209 will favor the new tunnel 123 which has a lower router metric value.

At stage D, the new firewall 112 receives current/new sessions/flows through the new tunnel 123. The new firewall 112 analyzes the received sessions/flows to determine whether they correspond to sessions/flows indicated in the current session/flow metadata 223. When the new firewall 112 determines indications of the current session/flow metadata 223 in current/new sessions/flows, it adds the indicated sessions/flows to current sessions/flows 203 which it forwards to the current firewall 110.

At stage E, the branch 104 tears down the current tunnel 121. The new firewall 112 continues to inspect incoming sessions/flows via the new tunnel 123 for indications of the current session/flow metadata 223 until inspection criteria are satisfied. The inspection criteria can comprise indications of session termination(s) and/or timeout(s) from sessions/flows indicated in the current session/flow metadata 223.

The eager and lazy switching protocols depicted in FIGS. 1 and 2 and throughout this disclosure each have advantages when considering which protocol to implement for deployments. For instance, the eager switching protocol immediately reroutes traffic from the current firewall 110 which immediately reduces load. Conversely, the lazy switching protocol is easier to implement because it does not involve coordinating instructions sent to the branch 104, the current firewall 110, and the new firewall 112 for tunneling session tear down and session/flow redirection. Choice of the eager switching protocol or the lazy switching protocol can depend on, for instance, current state of network topologies and associated costs. To exemplify, for some network topologies it is acceptable to maintain high (e.g., 90%) capacity at a firewall for an extended period (e.g., the time period until the current tunnel 121 is torn down during the lazy routing update), in which case the lazy switching protocol can be implemented. Conversely, for network topologies where capacity needs to stay below certain thresholds (e.g., 75%), the eager switching protocol can be implemented which more aggressively load balances traffic from the current firewall 110. The network topology can comprise, for instance, loads at firewalls in the cloud 106, routes of traffic redirection, costs associated with routes to and from firewalls (e.g., router metrics), etc.

In some embodiments, switching protocols can be omitted while establishing a tunneling session with the new firewall 112 and tearing down a session with the current firewall 110. For instance, when the firewalls 110 and 112 send traffic from the branch 104 to the Internet, each firewall can perform network address translation (NAT) to map a private IP address at the branch 104 to a public IP address for the firewalls in the cloud for outgoing traffic and to map a public IP address to a private IP address for incoming traffic (i.e., by replacing source and destination IP addresses in packet headers). This public IP address can be an elastic IP address allocated to a group of firewalls and/or virtual machines by a CSP or, alternatively, can be an IP address natively registered to an organization managing the cloud 106. In these embodiments, the new tunnel 123 is established with the new firewall 112 and advertised at the branch 104. Both the current tunnel 121 and the new tunnel 123 remain open, and the current firewall 110 and new firewall 112 process traffic normally. Because the traffic undergoes NAT at the current firewall 110 and new firewall 112, sessions may not be forwarded between the current firewall 110 and the new firewall 112 according to lazy and eager protocols—i.e., traffic is appropriately routed according to the public to private IP mapping. Once a tear down criteria for the current tunnel 121 is satisfied, for instance when all sessions/flows at the current tunnel 121 have expired or timed out, then the SD-WAN controller 100 instructs at least one of the current firewall 110 and the branch 104 to tear down the current tunnel 121.

The example operations are described with reference to an auto scale monitoring service, a SD-WAN controller, and an orchestrator for consistency with the earlier figure(s). The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

Figure 3:
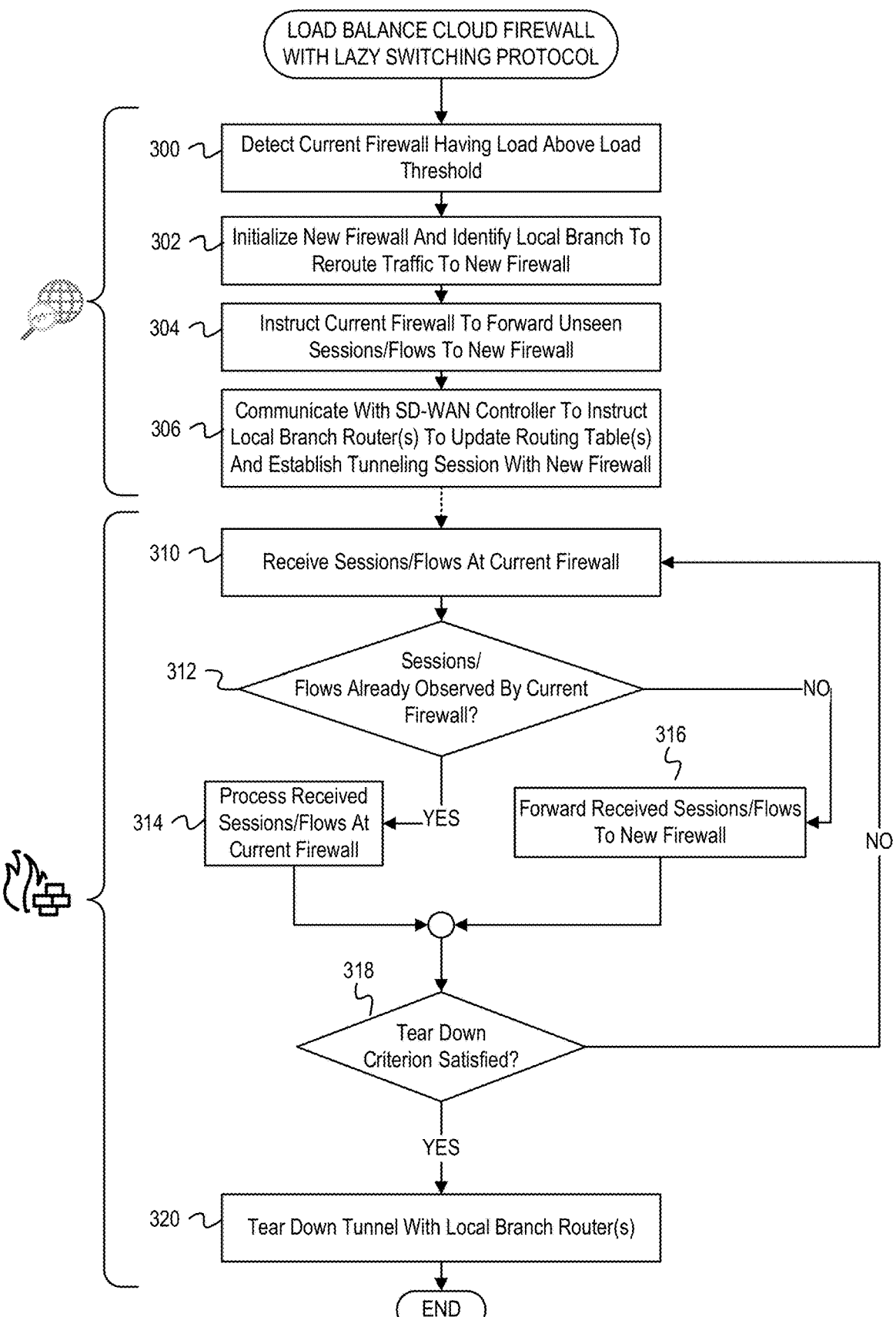
FIG. 3 is a flowchart of example operations for load balancing a cloud firewall with a lazy switching protocol.

FIG. 3 is a flowchart of example operations for load balancing a cloud firewall with a lazy switching protocol. At block 300, an auto scale monitoring service detects a current firewall having a load above a load threshold for the current firewall. Detection can involve receiving indications, querying periodically, active monitoring, etc. The auto scale monitoring service can receive indications in response to querying the API of a CSP. Alternatively, firewalls in the cloud can be hosted natively and can be automatically configured to communicate load metrics to the auto scale monitoring service according to a schedule or whenever load metrics exceed thresholds. In some embodiments, the firewalls have load thresholds stored and can automatically notify the auto scale monitoring service when current load exceeds the load threshold.

At block 302, the auto scale monitoring service initializes a new firewall and identifies a local branch to reroute traffic to the new firewall. The local branch comprises one or more network devices that are communicatively coupled to router(s) and have a current traffic load to the current firewall. The auto scale monitoring service can determine traffic load from all local branches (e.g., local area networks, mobile devices, personal computer endpoint devices, etc.) to the current firewall and can identify the local branch for traffic rerouting based on the traffic load from the local branch exceeding the excess load beyond the load threshold at the current firewall. The new firewall can be initialized by an orchestrator in communication with the auto scale monitoring service using a CSP API or, in some embodiments, the orchestrator can manually initialize the new firewall in the cloud.

At block 304, the auto scale monitoring service instructs the current firewall to forward unseen sessions/flows to the new firewall. The current firewall can maintain a table of current sessions and flows (e.g., using a packet analyzer that logs metadata for packets and associates packets by related flow or session). For instance, the current firewall can store sessions in the table based on session metadata according to a corresponding protocol. Implementations for identifying flows can vary based on corresponding protocols used for communication to and from the current firewall. For instance, for TCP flows, the current firewall can identify in packet headers the TCP protocol identifier and can track packets that have identical source IP address, destination IP address, source port, destination port, or that have their source IP address/destination IP address and source port/destination port reversed (to monitor bidirectional flows).

The current firewall can then, for TCP protocol packets, determine whether these four parameters correspond to a known TCP flow when determining whether to forward packets to the new firewall. The current firewall can detect flows and sessions inline and can intercept packets to forward to the new firewall.

At block 306, the auto scale monitoring service communicates with a SD-WAN controller to instruct router(s) at the local branch to update routing tables and establish a tunneling session with the new firewall. The updated routing tables include the established tunneling session to the new firewall. The route from the local branch to the new firewall has a higher router metric value than the route from the local branch to the current firewall. Additionally, the router(s) advertise the route from the local branch to the current firewall by sending messages according to advertisement protocols to neighboring routers.

At block 310, the current firewall receives sessions/flows from the local branch and other additional local branches, private networks, endpoint devices, etc. Due to the advertisement and lower router metric value of the tunneling session from the local branch to the current firewall, the sessions/flows from the local branch are sent to the current firewall.

At block 312, the current firewall determines whether the received sessions/flows have already been observed by the current firewall. The current firewall can, for instance, comprise a packet analyzer that logs packet metadata used to identify protocols, destination/source IP addresses and port, etc. that can be used in comparison to a table of metadata for known sessions/flows. The packet analyzer does not add further sessions/flows to the table for the current firewall traffic after the tunneling session is established between the new firewall and the local branch (according to instructions from the auto scale monitoring service). The packet analyzer can maintain an additional table of new/unseen sessions/flows to be forwarded to the new firewall. If the received sessions/flows have not yet been observed by the current firewall, then operations proceed to block 316. Otherwise, operations proceed to block 314.

At block 314, the current firewall processes received sessions/flows that were already observed by the current firewall. The current firewall can log the sessions/flows as capture files with a packet analyzer and can apply analytics such as malware verdict classifiers to generate firewall logs. Based on the generated firewall logs, the current firewall can throttle sessions/flows having malicious verdicts.

At block 316, the current firewall forwards received sessions/flows that were not previously observed by the current firewall to the new firewall. In some embodiments, the current and new firewall are on a same private network and the current firewall can forward the sessions/flows using private network addressing and without using secure encryption protocols. In other embodiments, the current and new firewall are separated across the cloud network and the current firewall can establish a secure connection with the new firewall prior to communication of sessions/flows (e.g., Transport Layer Security 1.3).

At block 318, the current firewall determines whether a tear down criterion is satisfied. Tearing down the tunnel conserves resources and use of a tear down criterion that delays tear down until the flows/sessions expire or timeout avoids traffic disruption. The tear down criterion can comprise whether sessions/flows that have been previously seen at the current firewall (i.e., that are not forwarded to the new firewall) have terminated/timed out. The tear down criteria can depend on protocols associated with each session/flow. For instance, headers for certain protocols can indicate a timer for a session/flow timing out, a timer for the entire session/flow prior to disconnection, a session/flow termination, etc. The tear down criteria can further comprise criteria at the current firewall, such as that a timer since the last packet from current sessions/flows exceeds a threshold amount of time. If the current firewall determines the tear down criterion is satisfied, then operations proceed to block 320. Otherwise, operations return to block 310.

At block 320, the current firewall tears down the tunneling session with the local branch router(s). Communication of the tear down is according to a corresponding tunneling protocol for the tunneling session. The local branch router(s) removes the route to the current firewall from the routing tables due to session tear down. As a result, the local branch router(s) subsequently send traffic along the route to the new firewall previously added to the routing table(s). The new firewall will recognize these sessions/flows as they were previously forwarded to the new firewall from the current firewall prior to tunneling session tear down.

Figure 4:
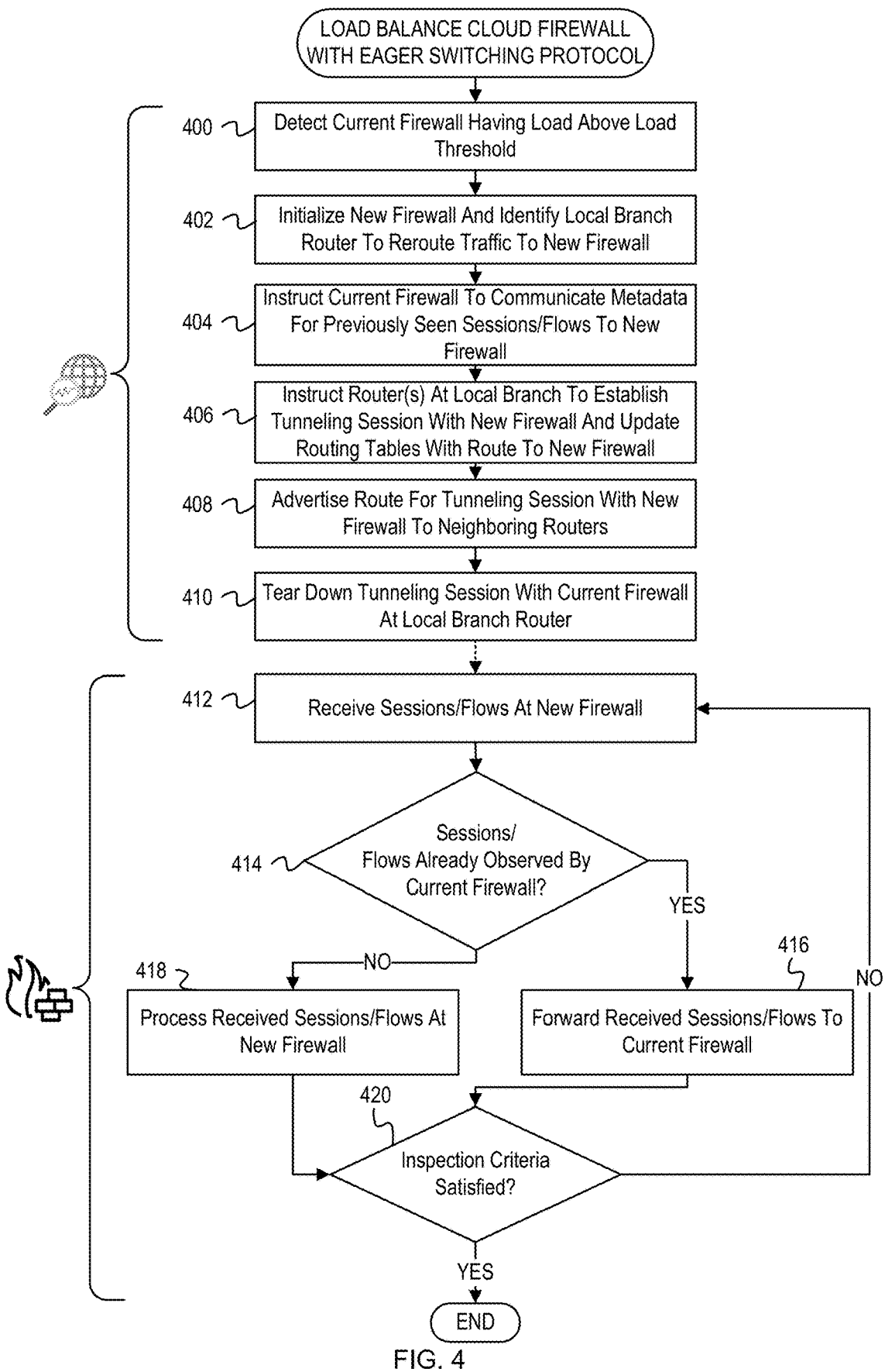
FIG. 4 is a flowchart of example operations for load balancing a cloud firewall according to an eager switching protocol of tunneling sessions.

FIG. 4 is a flowchart of example operations for load balancing a cloud firewall according to an eager switching protocol of tunneling sessions. As described earlier, the eager switching protocol attempts to resolve the load balancing issue more quickly with the overhead of more coordination to forward existing sessions/flows.

At block 400, an auto scale monitoring service detects a current firewall having a load above a load threshold. The operations at block 400 can be similar to, for instance, the operations described at block 300 in reference to FIG. 3.

At block 402, the initializes a new firewall and identifies a local branch to reroute traffic to the new firewall. The operations at block 402 can be similar to the operations depicted at block 302 in reference to FIG. 3.

At block 404, the auto scale monitoring service instructs the current firewall to communicate metadata for previously seen sessions/flows to the new firewall. The auto scale monitoring service can communicate the instructions using an API for a CSP hosting the current firewall and the new firewall or, in some embodiments, when the new firewall and current firewall are hosted natively by the auto scale monitoring service, can communicate with the current firewall through a native programming interface such as a proprietary interface. The current firewall maintains a table of active sessions/flows logged in capture files by a packet analyzer. This table comprises protocol information, timeout information, destination/source IP addresses and ports, session states, etc. The current firewall communicates metadata in this table to the new firewall that is sufficient to identify traffic from sessions/flows previously seen at the current firewall and when they timeout/terminate (e.g., total session timer data).

At block 406, the auto scale monitoring service instructs router(s) (e.g., through an intermediary SD-WAN controller managing a WAN of local branches) at the identified local branch to establish a tunneling session with the new firewall and to update routing tables to include a route to the new firewall. The instructions further direct the local branch router(s) to give the new route a router metric value lower than the router metric value for the tunneling session between the local branch and the current firewall.

At block 408, the local branch router(s) advertise the route for the tunneling session between the local branch router(s) and the new firewall to neighboring routers. The local branch router(s) advertise the new route using advertisement protocols by passing advertisement messages to the neighboring routers. This advertisement will result in traffic from the local branch router(s) routing through the tunneling session with the new firewall.

At block 410, the local branch router(s) tear down the tunneling session between the current firewall and the local branch router(s). Because traffic is being advertised along the tunneling session with the new firewall this does not disrupt existing sessions/flows. The local branch router(s) perform the tear down according to tunneling protocols used to establish the tunneling session (which can vary across firewalls).

At block 412, the new firewall receives sessions/flows from the local branch router(s) along the established tunneling session as well as sessions/flows from other local branches. The new firewall has a table of metadata for sessions/flows previously communicated along the tunneling session from the local branch to the current firewall that informs the new firewall how to handle the new traffic.

At block 414, the new firewall determines whether received sessions/flows have already been observed by the current firewall. The new firewall compares metadata in capture files for packets of the sessions/flows with its' table of sessions/flows previously received by the current firewall (as well as a separate table of sessions/flows directed at the new firewall). If the capture files comprise metadata indicated for sessions/flows in the table (e.g., same protocol, destination/source IP address and port), the new firewall determines that corresponding sessions/flows have already been observed by the current firewall. If the new firewall determines that the sessions/flows have already been observed by the current firewall, then operations proceed to block 416. Otherwise, operations proceed to block 418.

At block 416, the new firewall forwards the received sessions/flows already observed by the current firewall to the current firewall. In some embodiments, the current and new firewall are running on the same private network and the sessions/flows are forwarded without encryption/network address translation across the private network. In other embodiments, the current and new firewall are separated across the cloud and forwarding occurs using a secure encryption protocol such as TLS.

At block 418, the new firewall processes the received sessions/flows not already observed at the current firewall. The new firewall can process packets in the sessions/flows to identify corresponding sessions and initiate firewall protocols. The firewall protocols can analyze capture files according to profiles that can depend on the corresponding session/flow and can generate firewall logs that indicate malware verdicts. Sessions/flows having malware verdicts can be throttled at the new firewall.

At block 420, the new firewall determines whether inspection criteria are satisfied. The inspection criteria can be, for instance, that all sessions/flows indicated for forwarding to the current firewall are inactive/timed out. The new firewall can maintain a table of data for sessions/flows to forward and can remove sessions/flows from the table as they close/time out. The new firewall continues to inspect incoming sessions/flows for indications of forwarding until the inspection criteria are satisfied. If the inspection criteria are not satisfied, operations return to 412. Otherwise, the operations in FIG. 4 are complete.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 310, 312, 314, 316, and 318 can be performed across multiple sessions and/or flows in parallel or concurrently. With respect to FIG. 4, determining whether inspection criteria are satisfied at the new firewall is not necessary. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 5:
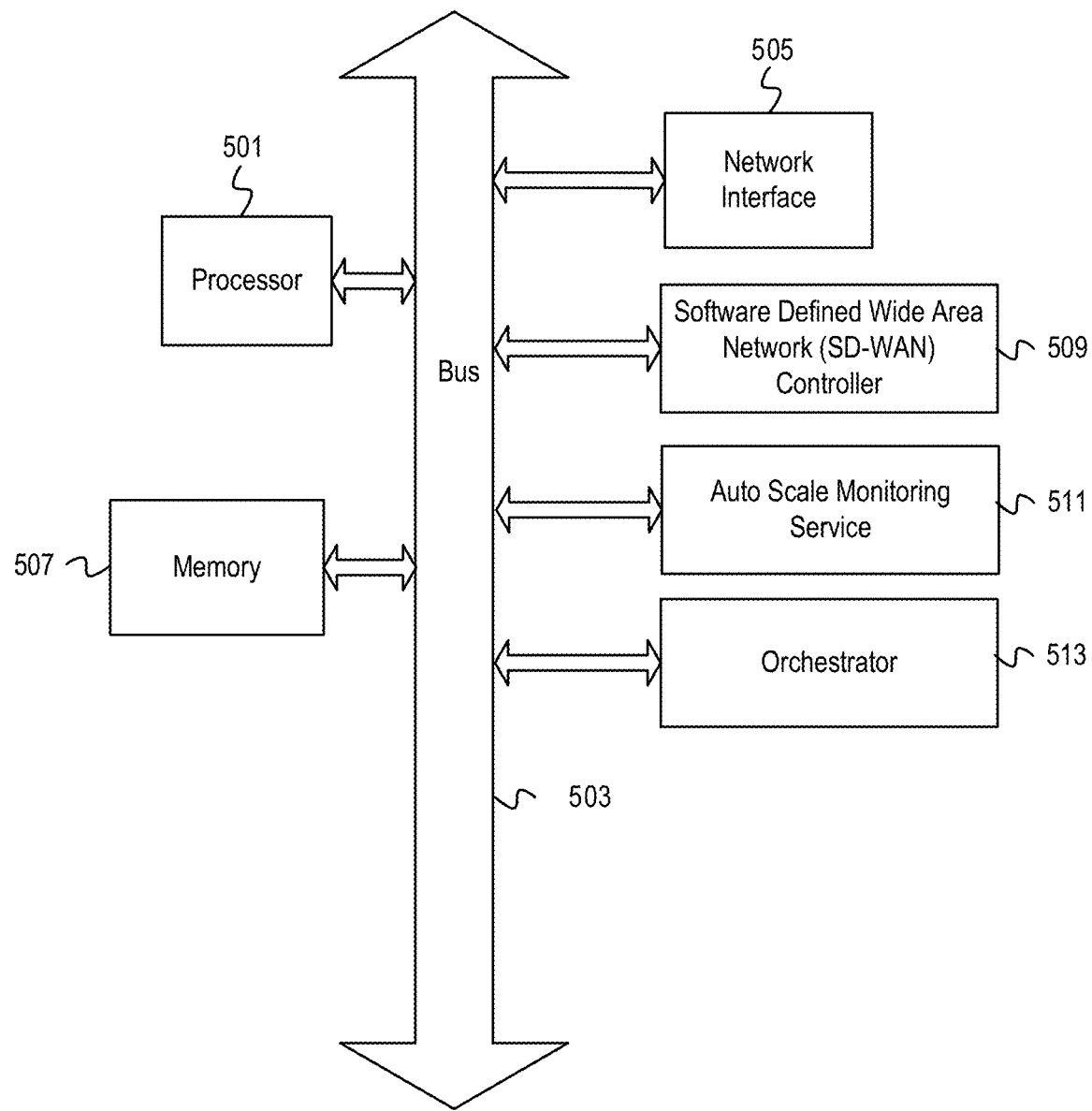
FIG. 5 depicts an example computer system with an auto scale monitoring service, a SD-WAN controller, and an orchestrator for load balancing a cloud firewall.

FIG. 5 depicts an example computer system with an auto scale monitoring service, a SD-WAN controller, and an orchestrator for load balancing a cloud firewall. The computer system includes a processor 501 (possibly including multiple processors, multiple cores, multiple nodes, and/or implementing multi-threading, etc.). The computer system includes memory 507. The memory 507 may be system memory or any one or more of the above already described possible realizations of machine-readable media. The computer system also includes a bus 503 and a network interface 505. The system also includes a SD-WAN controller 509, an auto scale monitoring service 511, and an orchestrator 513. The auto scale monitoring service 511 can implement eager and lazy switching protocols by communicating routing instructions to the SD-WAN controller 509 and firewall initialization/forwarding instructions to the orchestrator 513 as described variously above. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

While the aspects of the disclosure are described with reference to various implementations and exploitations, it will be understood that these aspects are illustrative and that the scope of the claims is not limited to them. In general, techniques for load balancing of firewalls or virtual machines using lazy and eager routing protocols as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

The invention claimed is:

1. A method comprising:
   detecting a load balancing event affecting a first firewall; and
   lazy load balancing between the first firewall and at least a second firewall, wherein lazy load balancing between the first and second firewalls comprises,
      identifying a first branch location with a set of one or more network devices communicatively coupled to the first firewall with a first tunnel;
      instructing a set of one or more routing devices at the first branch location to establish a second tunnel between the set of one or more network devices of the first branch location and a second firewall;
      instructing the first firewall to forward, to the second firewall, protocol data units (PDUs) for at least one of traffic flows and traffic sessions not previously observed by the first firewall;
      communicating router metric values that indicate a preference for the first tunnel over the second tunnel to the set of one or more routing devices at the first branch location; and
      based on one or more tear down criteria being satisfied, instructing at least one of the first firewall and the first branch location to tear down the first tunnel.

2. The method of claim 1, wherein the first firewall and the second firewall are hosted in a cloud.

3. The method of claim 1, wherein the one or more tear down criteria comprise a determination that at least one of traffic flows and traffic sessions not previously observed by the first firewall have at least one of inactive and timed out.

4. The method of claim 1, wherein communicating router metric values that indicate the preference for the first tunnel over the second tunnel to the set of one or more routing devices at the first branch location comprises communicating, to a wide area network controller managing the set of one or more routing devices, instructions to,
   update one or more routing tables for the set of one or more routing devices with a first route corresponding to the second tunnel, wherein the first route in the updated one or more routing tables has a higher router metric value than a second route corresponding to the first tunnel; and
   advertise the second route.

5. The method of claim 1, further comprising communicating, to a network orchestrator managing at least the first and second firewalls, instructions to,
   initialize the second firewall based, at least in part, on detecting the load balancing event; and
   communicate forwarding instructions to the first firewall and the second firewall.

6. The method of claim 5, wherein communicating the instructions to initialize the second firewall comprises communicating initialization parameters to a cloud service provider, wherein the initialization parameters are formatted according to an application programming interface for the cloud service provider.

7. The method of claim 1, wherein the lazy load balancing between the first firewall and at least the second firewall is based, at least in part, on a determination that a traffic load at the first firewall is acceptable for at least a time interval until the tear down criteria are satisfied.

8. The method of claim 7, wherein the determination that the traffic load at the first firewall is acceptable for at least the time interval until the tear down criteria are satisfied is based, at least in part, on network topology for a network comprising the first firewall and the second firewall.

9. A non-transitory, computer-readable medium having instructions stored thereon that are executable by a computing device, the instructions to:
   detect a load balancing event affecting a first firewall; and
   eager load balance between the first firewall and at least a second firewall, wherein the instructions to eager load balance between the first and second firewalls comprise instructions to,
      identify a first branch location with a set of one or more network devices communicatively coupled to the first firewall with a first tunnel;
      instruct a set of one or more routing devices at the first branch location to establish a second tunnel between the set of one or more network devices of the first branch location and a second firewall;

instruct the second firewall to forward, to the first firewall, protocol data units (PDUs) for at least one of traffic flows and traffic sessions previously observed by the first firewall;

communicate router metric values that indicate a preference for the second tunnel over the first tunnel to the set of one or more routing devices at the first branch location; and instruct at least one of the first firewall and the first branch location to tear down the first tunnel.

10. The computer-readable medium of claim 9, further comprising instructions to instruct the first firewall to forward, to the second firewall, indications of the at least one of traffic flows and traffic sessions previously observed by the first firewall, wherein the instructions to instruct the second firewall to forward, to the first firewall, the PDUs for at least one of traffic flows and traffic sessions previously observed by the first firewall are based, at least in part, on the indications of the at least one of traffic flows and traffic sessions previously observed by the first firewall.

11. The computer-readable medium of claim 9, further comprising instructions to, subsequent to instructing at least one of the first firewall and the first branch location to tear down the first tunnel, determine that an inspection criterion is satisfied; and based on the inspection criterion being satisfied, instruct the second firewall to terminate forwarding, to the first firewall, PDUs for at least one of traffic flows and traffic sessions previously observed by the first firewall.

12. The computer-readable medium of claim 11, wherein the inspection criterion comprises a determination that the at least one of traffic flows and traffic sessions previously observed the first firewall are at least one of inactive and timed out.

13. The computer-readable medium of claim 9, wherein the first firewall and the second firewall are hosted in a cloud.

14. The computer-readable medium of claim 9, wherein the instructions to communicate router metric values that indicate the preference for the second tunnel over the first tunnel to the set of one or more routing devices at the first branch location comprise instructions to communicate, to a wide area network controller managing the set of one or more routing devices, instructions to, update one or more routing tables for the set of one or more routing devices with a first route corresponding to the second tunnel, wherein the first route in the updated one or more routing tables has a lower router metric value than a second route corresponding to the first tunnel; and advertise the first route.

15. The computer-readable medium of claim 9, further comprising instructions to communicate to a software-defined wide area network (SD-WAN) orchestrator managing at least the first and second firewalls instructions to, initialize the second firewall based, at least in part, on detecting the load balancing event; and communicate forwarding instructions to the first firewall and the second firewall.

16. The computer-readable medium of claim 9, wherein the instructions to eager load balance between the first firewall and at least the second firewall are based, at least in part, on a determination that a traffic load at the first firewall is above a threshold load, wherein the threshold load corresponds to immediate traffic rerouting.

17. The computer-readable medium of claim 16, wherein the threshold load is based, at least in part, on network topology for a network comprising the first firewall and the second firewall.

18. An apparatus comprising:

a processor; and a computer-readable medium having instructions stored thereon that are executable by the processor to cause the apparatus to, detect a load balancing event affecting a first firewall; and eager load balance between the first firewall and at least a second firewall, wherein the instructions to eager load balance between the first and second firewalls comprise instructions to, identify a first branch location with a set of one or more network devices communicatively coupled to the first firewall with a first tunnel;

instruct a set of one or more routing devices at the first branch location to establish a second tunnel between the set of one or more network devices of the first branch location and a second firewall;

instruct the second firewall to forward, to the first firewall, protocol data units (PDUs) for at least one of traffic flows and traffic sessions previously observed by the first firewall;

communicate router metric values that indicate a preference for the second tunnel over the first tunnel to the set of one or more routing devices at the first branch location; and instruct at least one of the first firewall and the first branch location to tear down the first tunnel.

19. The apparatus of claim 18, wherein the computer-readable medium further has stored thereon instructions executable by the processor to cause the apparatus to instruct the first firewall to forward, to the second firewall, indications of the at least one of traffic flows and traffic sessions previously observed by the first firewall, wherein the instructions to instruct the second firewall to forward, to the first firewall, the PDUs for at least one of traffic flows and traffic sessions previously observed by the first firewall are based, at least in part, on the indications of the at least one of traffic flows and traffic sessions previously observed by the first firewall.

20. The apparatus of claim 18, wherein the computer-readable medium further has stored thereon instructions executable by the processor to cause the apparatus to, subsequent to instructing at least one of the first firewall and the first branch location to tear down the first tunnel, determine that an inspection criterion is satisfied; and based on the inspection criterion being satisfied, instruct the second firewall to terminate forwarding, to the first firewall, PDUs for at least one of traffic flows and traffic sessions previously observed by the first firewall.

* * * * *